United States Patent
Mucha

(10) Patent No.: US 9,661,118 B1
(45) Date of Patent: May 23, 2017

(54) WI-KEY ELECTRONIC MONITORING DEVICE AND METHOD OF USE

(71) Applicant: Loic Mucha, Hong Kong (HK)

(72) Inventor: Loic Mucha, Hong Kong (HK)

( * ) Notice: Subject to any disclaimer, the term of this patent is extended or adjusted under 35 U.S.C. 154(b) by 0 days.

(21) Appl. No.: 14/977,486

(22) Filed: Dec. 21, 2015

(51) Int. Cl.
*H04M 1/725* (2006.01)
*H04W 24/08* (2009.01)

(52) U.S. Cl.
CPC ..... *H04M 1/7253* (2013.01); *H04M 1/72569* (2013.01); *H04W 24/08* (2013.01)

(58) Field of Classification Search
CPC H04M 1/7253; H04M 1/72569; H04W 24/08
See application file for complete search history.

(56) References Cited

U.S. PATENT DOCUMENTS

| | | | | |
|---|---|---|---|---|
| 7,165,998 | B2* | 1/2007 | Lee | H01R 13/6658 439/660 |
| 9,060,212 | B2* | 6/2015 | Loic | H04Q 9/00 |
| 2005/0109841 | A1* | 5/2005 | Ryan | G06F 13/385 235/380 |
| 2007/0191059 | A1* | 8/2007 | Liow | H04M 1/0254 455/558 |
| 2008/0201764 | A1* | 8/2008 | Lu | G06F 21/123 726/2 |
| 2012/0123233 | A1* | 5/2012 | Cohen | A61B 10/007 600/345 |
| 2014/0335728 | A1* | 11/2014 | Pocrass | H01R 24/62 439/607.35 |

* cited by examiner

*Primary Examiner* — Brandon Miller
(74) *Attorney, Agent, or Firm* — Carrie Stroup

(57) ABSTRACT

A Wi-Key electronic monitoring device, and method of use, to receive the identification number and sensor data (e.g. weight, temperature) of a compatible apparatus (e.g. kitchen utensils, toys). The Wi-Key device then wirelessly transmits the processed raw sensor data to a user's device (i.e. a smartphone) to be analyzed and stored, but only if the apparatus's identification number is valid. The user's mobile device may also comprise software to assist in monitoring conditions within and around the apparatus, or to transmit commands to the Wi-Key device to control the apparatus's operation. The Wi-Key device comprises three units: a flash drive like, pluggable Wi-Key unit; and a connector unit affixed to an ID PCB unit that both are embedded within the apparatus. One Wi-Key pluggable unit may be used with a wide variety of types of compatible apparatuses, and/or receive sensor data simultaneously from multiple sensors within or near an apparatus.

20 Claims, 14 Drawing Sheets

WI-KEY ELECTRONIC MONITORING DEVICE AND METHOD OF USE

FIELD OF THE DISCLOSURE

The present disclosure relates generally to a portable, wireless monitoring device, generally shaped and sized like a USB flash drive. It is plugged into a variety of types of compatible apparatuses, such as for kitchen, lawn, child care, to collect and transmit the apparatus's identification number and sensor data to a user's mobile phone. The device enables a user to remotely monitor conditions within and around a compatible apparatus, and/or to control its operation once the identification number is verified.

The trademarks that are used in the present disclosure are the property of the respective owner companies and are used herein for illustrative purposes only. The inventor does not claim any rights on them.

BACKGROUND OF THE DISCLOSURE

The present disclosure that comprises the Wi-Key monitoring device is a non-obvious improvement on the iKT universal monitoring device disclosed in U.S. Pat. No. 9,060,212 B2 that issued on Jun. 16, 2015 to M. Mucha, the entirety of which is herein incorporated by reference. In particular, the Wi-Key monitoring device is able to receive raw sensor data from a wide variety of types of $I_2C$ sensors (e.g. accelerometers, barometers, moisture sensor, etc.). It can also receive raw data from multiple transducer sensors within the same apparatus simultaneously (thermistor, load cell, contact, etc.). And it can identify the type of apparatus that the Wi-Key device is inserted into (e.g. a kitchen spatula), as well as the identification number of a particular apparatus. The raw sensor data is processed by the Wi-Key monitoring device, and then wirelessly transmitted to a user's device, wherein a mobile application of the present disclosure can analyze and display the sensor data if the identification number of the apparatus is verified (e.g. not a knock-off apparatus).

In today's high technology industry, there are a multitude of electronic devices available for users to remotely monitor apparatuses using their smartphones or tablets (e.g. camera to watch children). Unfortunately, these devices have limitations in their ability to monitor more than one type of sensor and/or apparatus simultaneously and/or sequentially, and to wirelessly exchange information in real-time with a remotely located user. These devices also require the apparatuses that are housing the sensor to include electronic components for analyzing the sensor data before wirelessly transmitting it to the user electronic computing device (e.g. smartphone). This requires extra costs in the production of these apparatuses because of the extra electronic circuitry. And, the devices are often only able to wirelessly transmit sensor data to a user's smartphone, but they are not able to also receive commands to control the operation of the apparatus (e.g. power on/off, speed, direction, etc.).

Therefore, there is a need for a device that wirelessly exchanges information with a user electronic computing device comprising sensor data and control commands for monitoring of a wide variety of apparatuses simultaneously and/or sequentially. Only one device would be required to monitor a multitude of sensors types housed within different types of compatible apparatuses, such as temperature and weight sensors for cooking, humidity and barometric pressure for weather conditions, water sprinkler on/off controls for lawn maintenance, toys for watching children, and so forth. And, the apparatuses should not be required to house additional electronic components to analyze the sensor data because this is accomplished by a software application on the user electronic computing device.

It would also be especially advantageous if the monitoring device were portable by being easy to physically handle and plug into and out of compatible apparatuses.

And it would be advantageous to prevent counterfeit apparatus's if the identify of each apparatus is verified as valid before sensor data is analyzed and displayed to the user.

The Wi-Key monitoring device of the various embodiments of the present disclosure provides all of these features, and more.

SUMMARY OF THE DISCLOSURE

The various embodiments disclosed herein comprise a Wi-Key electronic monitoring device, and its method of use, to receive data from a wide variety of types of sensors (e.g. measuring weight, temperature, noise, etc.) housed within apparatuses (e.g. kitchen appliances, children's toys and lawn equipment) that are electronically compatible with the monitoring device. The Wi-Key monitoring device then wirelessly transmits the processed sensor data to a user mobile device (i.e. a smartphone), which comprises an application or software installed in memory to assist in analyzing and displaying the data once the identification number of the apparatus is verified. Furthermore, in one or more embodiments, the Wi-Key device is able to receive commands from the user device to control the operation of a compatible apparatus.

In one or more embodiments, the Wi-Key electronic monitoring device is shaped similar to a USB flash drive or memory stick, and comprises dimensions of about 50×20× 10 millimeters. Furthermore, the Wi-Key device comprises three primary components: a pluggable unit; a connector unit; and an identification and printed circuit board (ID PCB) unit. In one or more embodiments, the connector unit and the ID PCB unit are welded together and affixed inside a compatible apparatus that is being remotely monitored and/or remotely operated (e.g. a toy, kitchen utensil, appliance, etc.) from a user electronic computing device (e.g. smartphone).

The pluggable unit is shaped and sized like a USB flash drive, and as such is portable. It plugs into the connector unit on the end opposing the ID PCB unit. The pluggable unit further comprises: a back case insert-able into the unit's opposing end; a substantially hollow, rectangular shaped mid-case; and a substantially flat, square-shaped front case. The front case is slide-able into a cutout on the mid-case to allow the user access to the battery housed within the mid-case. And, the back case may further comprise a magnet to enable the Wi-Key device to stick to a magnetic surface, such as a refrigerator door, so that it is readily accessible.

The pluggable unit mid-case houses the following components: 1) a micro-controller for transmitting and receiving sensor data to surrounding enabled user electronic computing devices: 2) a battery to empower the micro-controller and sensors when the Wi-Key device is plugged in to a compatible apparatus; 3) a voltage amplifier; 4) a voltage regulator; 5) a debugger for programming the micro-controller during mass production; 6) a light emitting diode (LED) viewable on the outside of the Wi-Key monitoring device to indicate the circuit state; and 7) a twelve pins connector on the end of the monitoring device for connecting with the sensors within or near the apparatus.

An Electrically Erasable Programmable Read-Only Memory (EEPROM)) card (or chip) to read and write the sensor data memory is located within the compatible apparatus and connected to the sensor(s) (see FIGS. 7G and 7H). The mid-case microcontroller processes information (e.g. raw data) directly from one or more of the sensors and/or from the EEPROM chip, and subsequently sends the processed data to the micro-controller (e.g. a Bluetooth® chip), which wirelessly transmits it to a user mobile device, such as a smartphone with Bluetooth® or Wi-Fi capacity that the Wi-Key device is paired with. The mid-case microcontroller can also receive commands and data from the user mobile device, process and send it to the compatible apparatus's operational controls and/or sensors.

A mobile application or software installed on the user electronic computing device (e.g. a smartphone with a mobile app) may also display information and instructions to assist the user in utilizing the compatible apparatus; and/or provide the ability for the user to wirelessly transmit commands to the Wi-Key device to control one or more types of apparatuses, such as ovens, irons, and coffee pots. For example, the user electronic computing device can send a signal to the apparatus (e.g. oven) via the Wi-Key device to change the operating state of the apparatus (e.g. turn off an oven).

In the various embodiments exemplified herein, the wireless communication between the Wi-Key device and the user electronic computing device is via Bluetooth® technology, such as a Bluetooth® chip (V2.1, 3.0, 4.0, 4.1, 4.2 or later), but other wireless means are within the scope of this disclosure, and are well known in the art (e.g. wireless unit for Wi-fi Comprising wireless local area network (WLAN) components that are based on the Institute of Electrical and Electronics Engineers' (IEEE) 802.11 standards).

The Wi-Key monitoring device is utilized with a wide variety of types of electronic compatible apparatuses comprising a variety of types of sensors that can transmit and receive data from the Wi-Key device's microcontroller. The apparatuses are "compatible" with the Wi-Key device by completing an electrical circuit when the Wi-Key device is inserted into the apparatus and sends data through the circuit to a wireless unit (i.e. Bluetooth® or Wi-Fi) within the Wi-Key device, which subsequently wirelessly transmits the data to a user electronic computing device (e.g. smartphone). Therefore, one Wi-Key device is compatible for use with any compatible apparatus, such as: kitchen utensils (i.e. mixing bowls to measure the weight of ingredients, spatulas and oven mats to measure food temperature, cups to measure liquid volumes, etc.), lawn equipment (i.e. sprinkler systems), home alarm systems (e.g. fire, locks), children's toys and childcare equipment, etc.

Therefore, the Wi-Key device can be used with a variety of types of compatible electronic apparatuses, comprising one or more sensors, and with or without a graphical user interface to display the sensor data directly on the compatible apparatus. By pairing the Wi-Key device with the electronic apparatus, the apparatus would no longer require electronic components to analyze the sensor output or a separate monitor to display it. The Wi-Key device and the user mobile device would provide this function.

A method of use of the Wi-Key device with compatible apparatuses comprises: plugging the Wi-Key device into a slot on a compatible apparatus; and the Wi-Key microcontroller reading and transmitting the identification number of the apparatus that is stored within its EEPROM card, as well as any sensor data or information, to a user electronic computing device. The application installed on the user device will then check if the identification number is confirmed by the manufacturer. For example, the application may access via a wired or wireless network a database on a remote server that stores all valid identification numbers for all compatible apparatuses. If the identification is valid, then the application will analyze the sensor data. But if the identification number is not valid, then the sensor data cannot be analyzed. This may also comprise a message being displayed on the user device stating that the apparatus is not enabled for use with a Wi-Key device.

In an exemplary embodiment, the Wi-Key electronic monitoring device is used to assist in the preparation of a meal. The Wi-Key device receives data from one or more sensors housed within a compatible kitchen appliance and/or utensil with an identification number assigned to it. The compatible apparatuses are able to monitor parameters involved in cooking, such as the temperature, weight, and volume of solid and liquid food and recipe ingredients. The user does not need to be in the immediate vicinity of the appliance or utensil to receive the data on their mobile device, but may instead be located at a distance, such as in a separate room of a home. Because the Wi-Key device can wirelessly communicate with a variety of types of sensors housed within a variety of types of kitchen appliances and utensils, then the user can utilize one Wi-Key device to receive raw sensor data throughout the process of cooking a meal using different appliances and utensils: from weighing the ingredients in a mixing bowl; measuring the volume of a liquid in a measuring cup; and monitoring the temperature inside an oven or on a skillet cooking surface. And because the Wi-Key monitoring device is "universal", then the User merely moves the monitoring device from one appliance and utensil to the next while preparing the food by merely removing and inserting the Wi-Key device into the measuring cup, then the mixing bowl, then the spatula/turner, and then the oven. The user can then move the Wi-Key to another compatible apparatus within or outside the home, such as to a child monitoring device in a nursery or to the lawn sprinkler system.

Another method of use of the present disclosure, is to utilize the user electronic computing device to transmit commands for controlling compatible apparatuses, such as kitchen appliances and automated utensils. In some embodiments, the user may transmit commands to the sensors by wirelessly transmitting the command from the user device to the Wi-Key monitoring device that subsequently transmits it to the operational controls in the compatible appliance and utensil. For example, the Wi-Key device can be used to remotely reduce the temperature of a kitchen oven, turn on/off a coffee pot, and/or reduce the speed on a mixer or blender.

The Wi-Key device is also beneficial for use in a variety of situations. For example, the device is useful for events requiring precise control of electronic apparatuses, such as cooking difficult recipes. One Wi-Key device can also monitor various aspects of a user's life: lawn maintenance; child monitoring; etc. The device is also suitable for use by individuals with physical impairments, such as vision and mobility, to assist them in controlling electronic apparatuses. And it is also useful for individuals whose attention is diverted to other tasks (i.e. watching infants), or who are located in rooms other than where the apparatuses are located.

The present disclosure also comprises a user electronic computing device having an application (i.e. mobile application) installed within memory, for use in receiving, transmitting, and viewing commands and data between the user mobile device and the Wi-Key device. The user device may also comprise the ability to emit audio messages from the Wi-Key device, such as for visually impaired Users.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

DETAILED DESCRIPTION OF THE EXEMPLARY EMBODIMENTS OF THE DISCLOSURE

Figure 1:
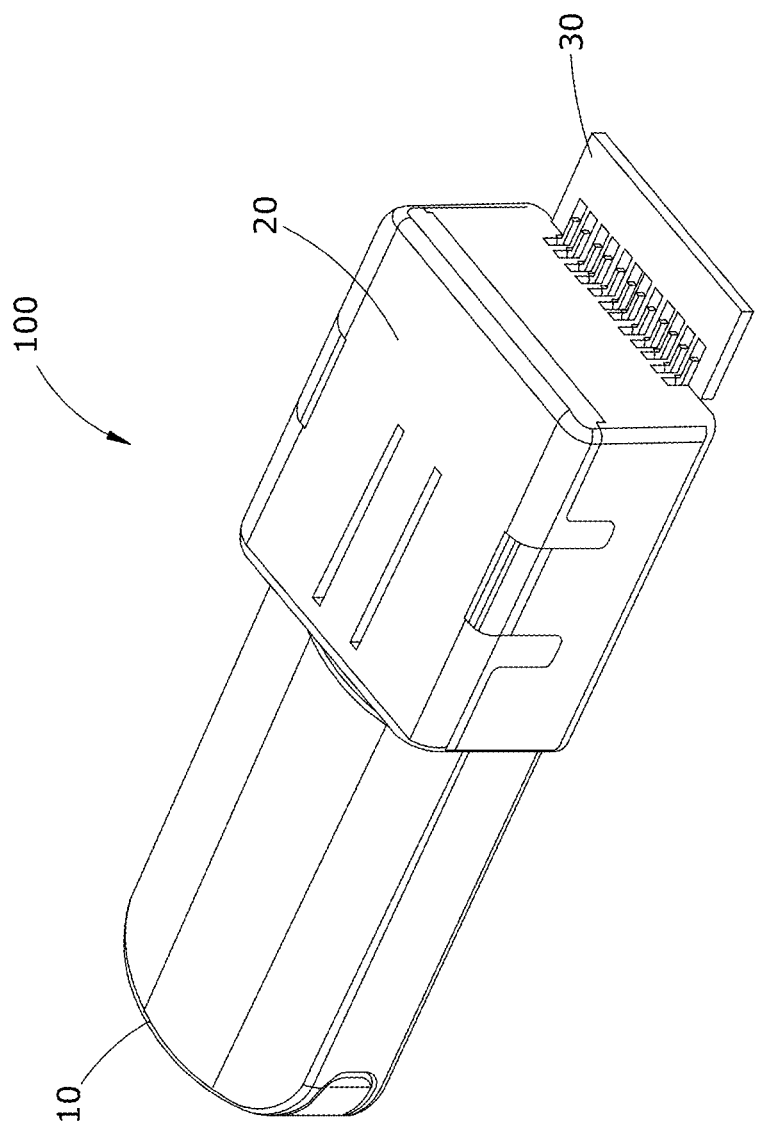
FIG. 1 is an illustration of the Wi-Key monitoring device assembled.

The following definitions and methods are provided to better define the various embodiments of the present disclosure and to guide those of ordinary skill in the art in the practice of the present invention. Unless otherwise noted, terms are to be understood according to conventional usage by those of ordinary skill in the relevant art.

As used herein, the term "Wi-Key monitoring device" or "Wi-Key device" refers to a three unit electronic device disclosed herein comprising: a pluggable unit; a connector unit; and an ID PCB unit. The Wi-Key device comprises an electronic circuit enabled to receive and/or transmit data between a compatible apparatus sensors and/or controls, and then wirelessly receive and/or transmit the data to a user electronic computing device.

As used herein, the term "compatible apparatus" refers to an apparatus that the user wishes to remotely monitor the conditions within (e.g. weight, etc.) and/or around (e.g. camera, room temperature, etc.) using one or more sensors housed within it; and/or to control the operation of the apparatus remotely from a user electronic computing device. The compatible apparatus in most cases will comprise a slot to allow at least a part of the Wi-Key device to be temporarily inserted (e.g. the pluggable unit). It may further comprise at least part of the Wi-Key device to be permanently affixed within the compatible apparatus (i.e. the connector unit and the ID PCB unit). And the compatible apparatus may further comprise a unique identification number that must be verified before sensor data is analyzed by the mobile app.

As used herein, the term "electronic computing device" or "user device" or "user mobile device" refers to a user's computing device comprising wireless communications capabilities, such as Bluetooth® or Wi-Fi technology or the like, for receiving data wirelessly from the Wi-Key monitoring device. Non-limiting examples of user electronic computing devices comprise: laptops, smartphones, and tablets, etc.

As used herein, the term "sensor unit" and/or "sensor" refers to an electrical circuit housed within the apparatus (e.g. spatula, toy . . . ) that enables transmission of raw sensor data and the apparatus identification code to the Wi-Key monitoring device, as well as receipt and execution of commands from the user electronic computing device (e.g. activate a camera) and Wi-Key device that controls the apparatus operations. A compatible apparatus may have a plurality of sensors, and the Wi-Key device of the present disclosure is able to monitor a plurality of sensors simultaneously and/or sequentially. For example, the Wi-Key device may concurrently monitor at least one to six different types of Inter-Integrated ($I_2C$) sensors simultaneously, from a list of 250 $I_2C$ different sensor types.

In this description, the directional prepositions of up, upwardly, down, downwardly, front, back, top, upper, bottom, lower, left, right and other such terms refer to the Wi-Key monitoring device as it is oriented and appears in the drawings and are used for convenience only; they are not intended to be limiting. And reference to the "opposing end", or the like, indicates as pictured (e.g. in FIG. 2) the pluggable unit left end that is opposite the right end that plugs into the connector unit 20.

Figure 2:
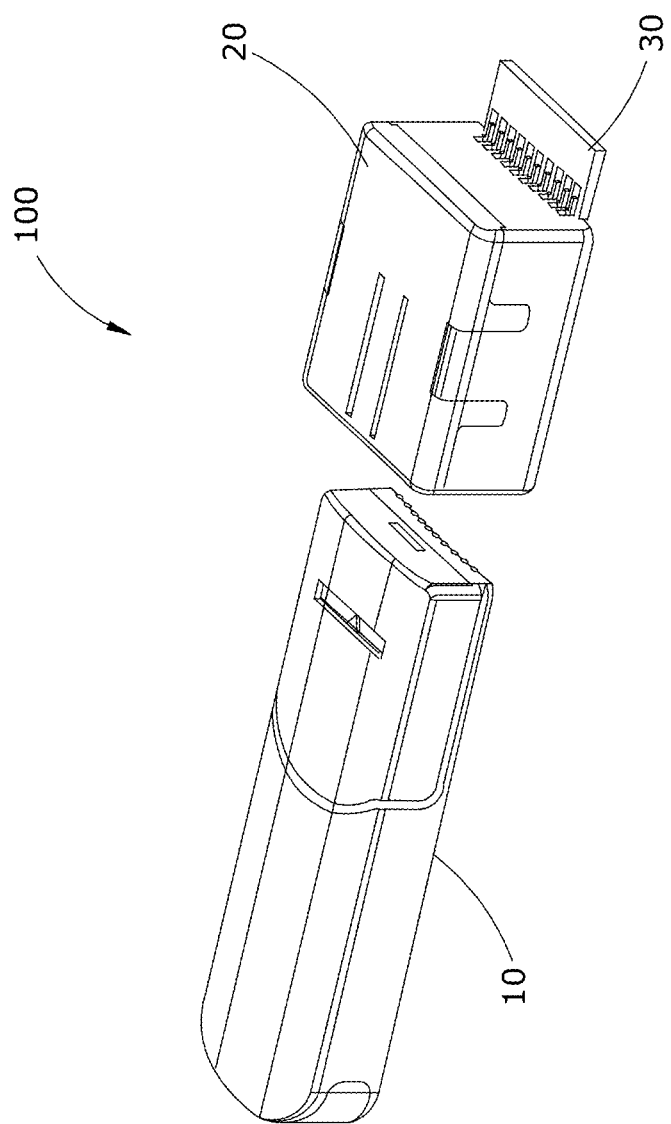
FIG. 2 is an illustration of the device of FIG. 1 separated into the Wi-Key unit that plugs into the connector unit, and in which the connector unit is permanently affixed to the ID PCB unit.

Now referring to drawings in FIGS. 1-7H, wherein similar components are identified by like reference numerals, there is seen in FIG. 1, the Wi-Key monitoring device 100 assembled, and comprising three main units: a left pluggable unit 10; a middle connector unit 20; and a right ID PCB unit 30. FIG. 2 illustrates the device of FIG. 1 broken into its two main components as per its use within a compatible apparatus: the first component is the portable, USB flash drive like, pluggable unit 10 component. The unit 10 is plugged into the connector unit 20. The connector unit 20 and ID PCB unit 30 form the second component, which is permanently affixed within a compatible apparatus (e.g. see FIGS. 5A-6B).

The general outer shapes of the units are also easily viewed in FIGS. 1 and 2 as per the following. The Wi-Key monitoring device 100, assembled, is generally thin rectangular shaped on a left side 10 with a curved outer end, while generally square shaped on the right side 20. The right side further comprises a flat rectangular ID PCB plate 30 affixed perpendicular to and extending outward from the connector 20 end on the bottom side edge, and comprising a twelve pins connector. There is also a difference in thickness between the units, with the pluggable unit 10 being less than the connector unit 20, and the ID PCB unit 30 being substantially less than both the 10 and 20 units.

Pluggable Unit

Figure 3:
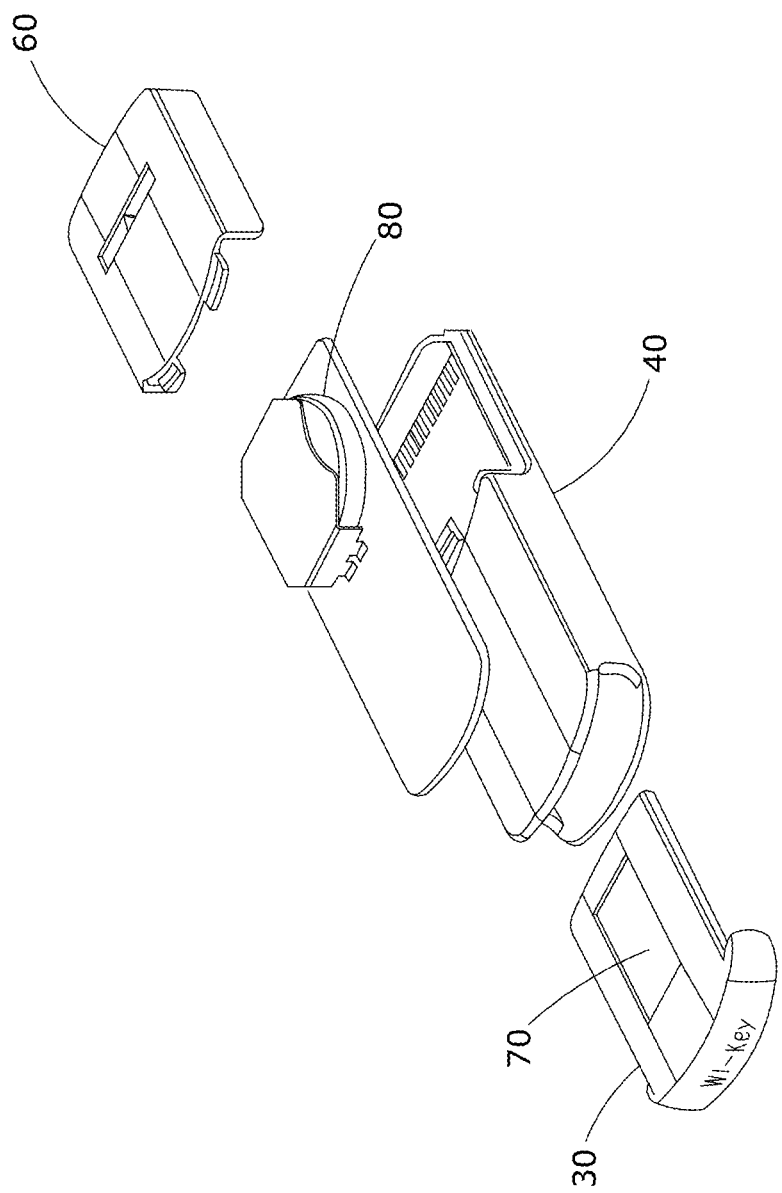
FIG. 3 is an illustration of an exploded view of the pluggable unit.

As illustrated in the exploded view of FIG. 3, the pluggable unit further comprises: a back case 50 insert-able into the pluggable unit's opposing end; a substantially hollow, rectangular shaped mid-case 40; and a substantially flat, square-shaped front case 60 on the connector access end, that slides into a groove encircling an identically shaped cut-out carved into the mid-case 40. The front case 60 is slide-able to allow the user access to the battery housed within the mid-case 40.

In the exemplified embodiment of FIG. 3, the back case 50 further comprises a curved opposing (left) end with its inner surface affixed perpendicularly to a substantially flat, rectangular shaped section. Centered within the rectangular section is a flat rectangular magnet 70. Back case 50 is slide-able into the opening on the opposing (left) end of the mid-case 40. The magnet is used to stick the Wi-Key device 100 to magnetic surfaces, such as a refrigerator door, so that the Wi-key is easily accessible to the user.

As illustrated in FIGS. 7A-7F, mid-case 40 further comprises a micro-controller for transmitting and receiving sensor data to surrounding enabled user electronic computing devices. The exemplified pluggable unit mid-case 40 houses a micro-controller comprising a Bluetooth® chip (V2.1, 3.0, 4.0, 4.1, 4.2 or later) for transmitting and receiving data to surrounding Bluetooth® enabled User's electronic computing devices. It is noted, though, that one of skill in the art could readily substitute the Bluetooth® chip with other wireless transmission mechanisms (e.g. Wi-Fi unit) that a user electronic computing device could wirelessly communicate with.

The illustrated mid-case 40 further comprises an electrical printed circuit board comprising: 2) a battery to empower the micro-controller (of FIG. 7F) and sensors when the Wi-Key device is plugged in; 3) a voltage amplifier (FIG. 7E); 4) a voltage regulator; 5) a debugger for programming the micro-controller during mass production (FIG. 7D); 6) a light emitting diode (LED) viewable on the outside of the Wi-Key monitoring device to indicate the circuit state; and 7) a twelve pins connector on the end of the monitoring device for connecting with the sensors (Table 1 infra).

In one or more embodiments, the power source is via a 3.3 volt or 2.5 volt battery that is rechargeable via a USB connector. Other power sources may be used with the Wi-Key device 100 as determined by the intended use and/or the location of the device 100. For example, a Wi-Key device for use outdoors, such as a garden tool, may comprise a solar panel as a power source.

Connector Unit and ID PCB Unit

Figure 4:
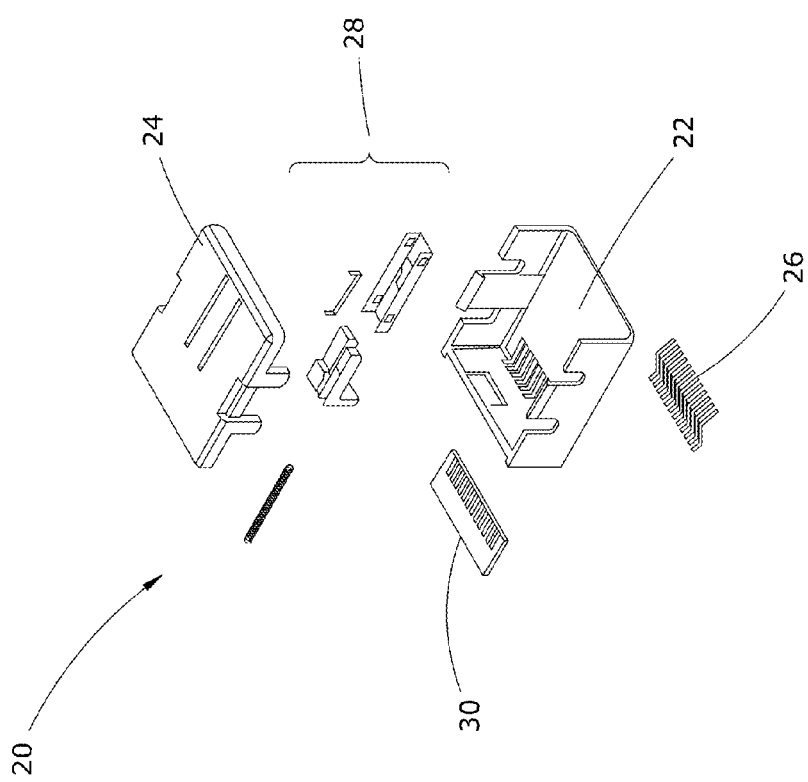
FIG. 4 is an illustration of an exploded view of the connector unit.

FIG. 4 is an exploded view of the connector unit 20 and the ID PCB unit 30 that reside permanently affixed within a compatible apparatus. In the exemplified embodiment, connector unit 20 is substantially square shaped with a thickness substantially less than the width and length, and comprising: a substantially flat square top case 24, with a plurality of downward side extending members (two shown) able to connect with matching rectangular cutouts in a bottom case 22. Bottom case 22 is three sided with an open end and with the matching cutouts on two or more sides and snap mechanisms to secure it to the top case 24. When the top case 22 and the bottom case 24 are joined, they form an opposing closed end, and an open end where the pluggable unit 10 (not shown) is inserted into the Wi-Key device via a slot 110 in a compatible apparatus (e.g. at the base of a mixing bowl—see FIG. 6B, 110).

Connector unit 20 also comprises a mechanical unit or mechanism 28 with a spring component, amongst others as shown in FIG. 4, to assist in easily plugging and unplugging the unit 10 (not shown) into unit 20's open end.

Figure 7A:
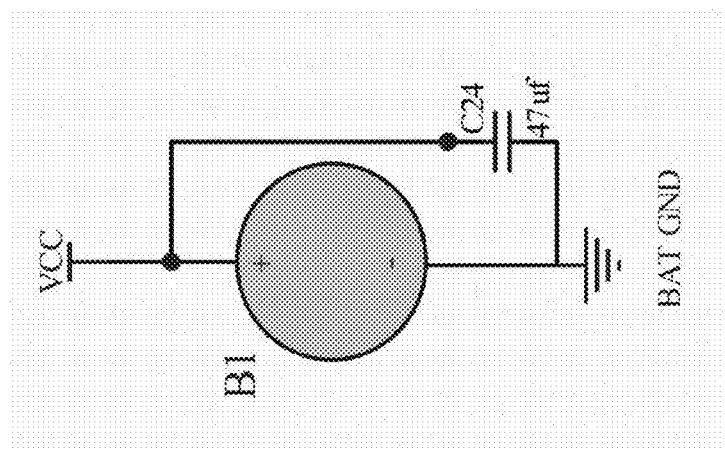
FIG. 7A is an exemplary schematic diagram of the electrical circuit for the Wi-Key device battery.
Figure 7B:
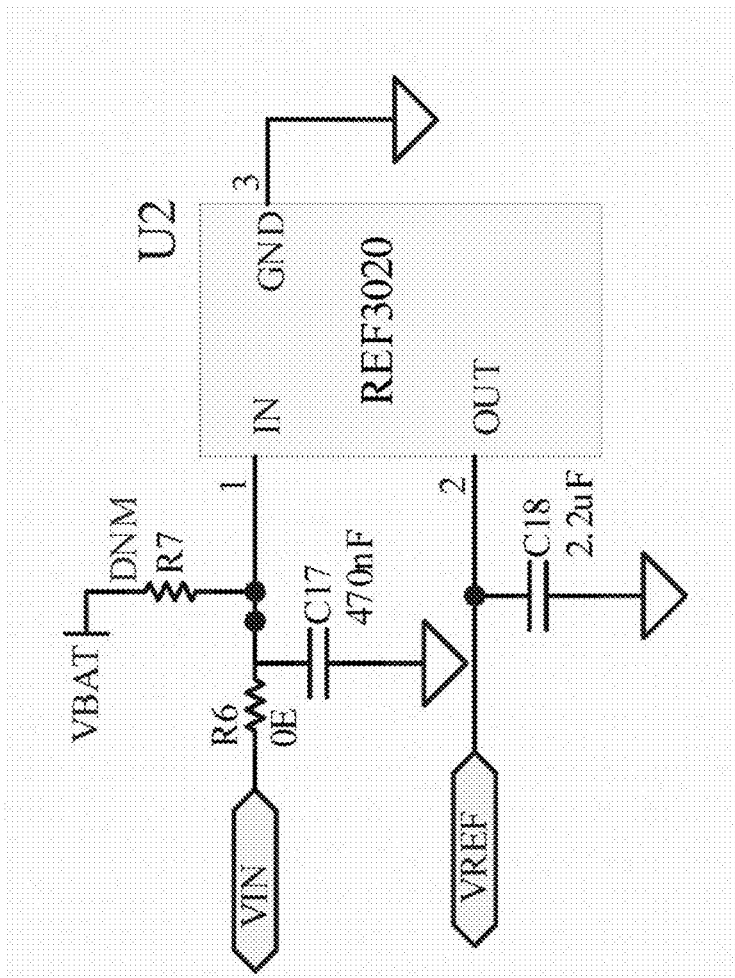
FIG. 7B is an exemplary schematic diagram of the electrical circuit for the Wi-Key device reference IC.
Figure 7C:
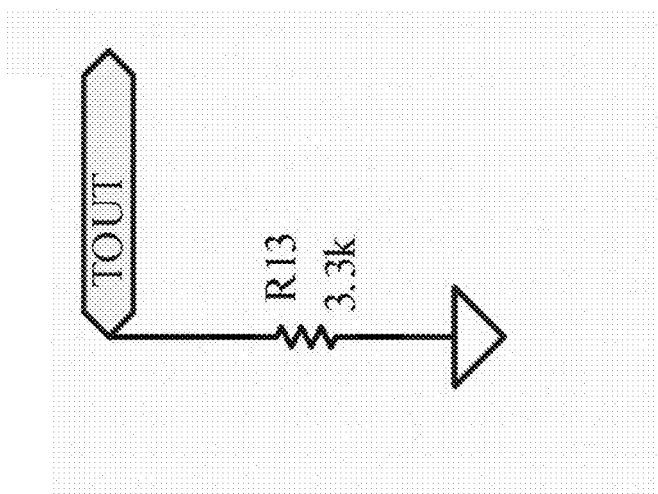
FIG. 7C is an exemplary schematic diagram of the electrical circuit for a compatible thermistor.
Figure 7D:
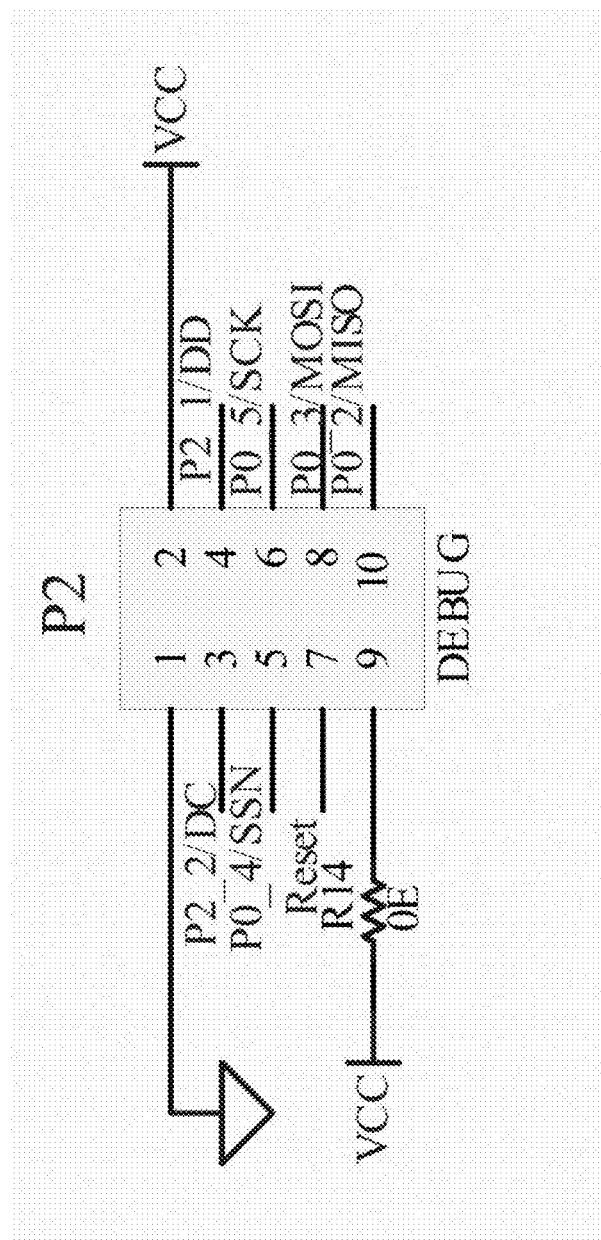
FIG. 7D is an exemplary schematic diagram of the electrical circuit the debugger for programming.
Figure 7E:
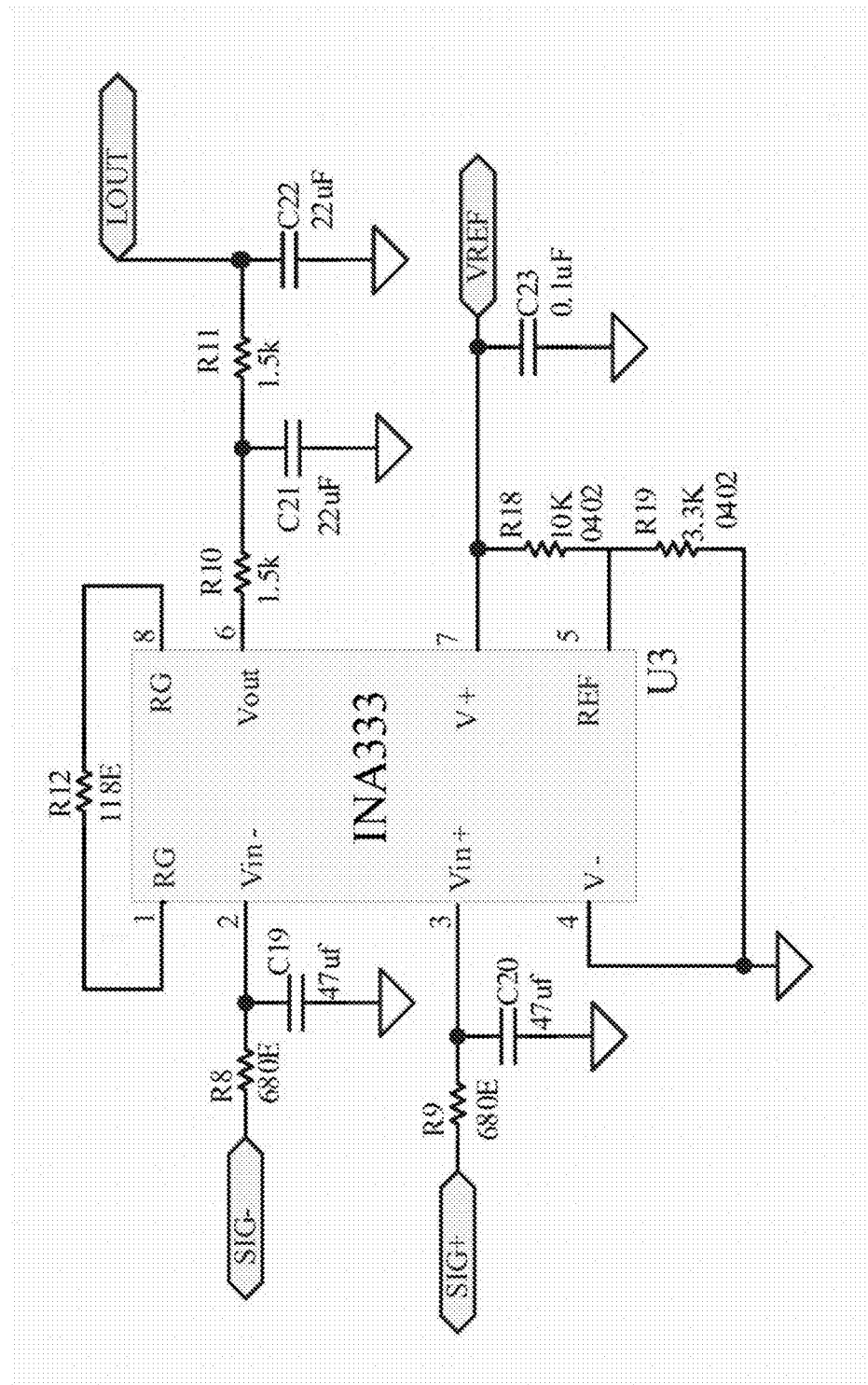
FIG. 7E is an exemplary schematic diagram of the electrical circuit of the amplifier.
Figure 7F:
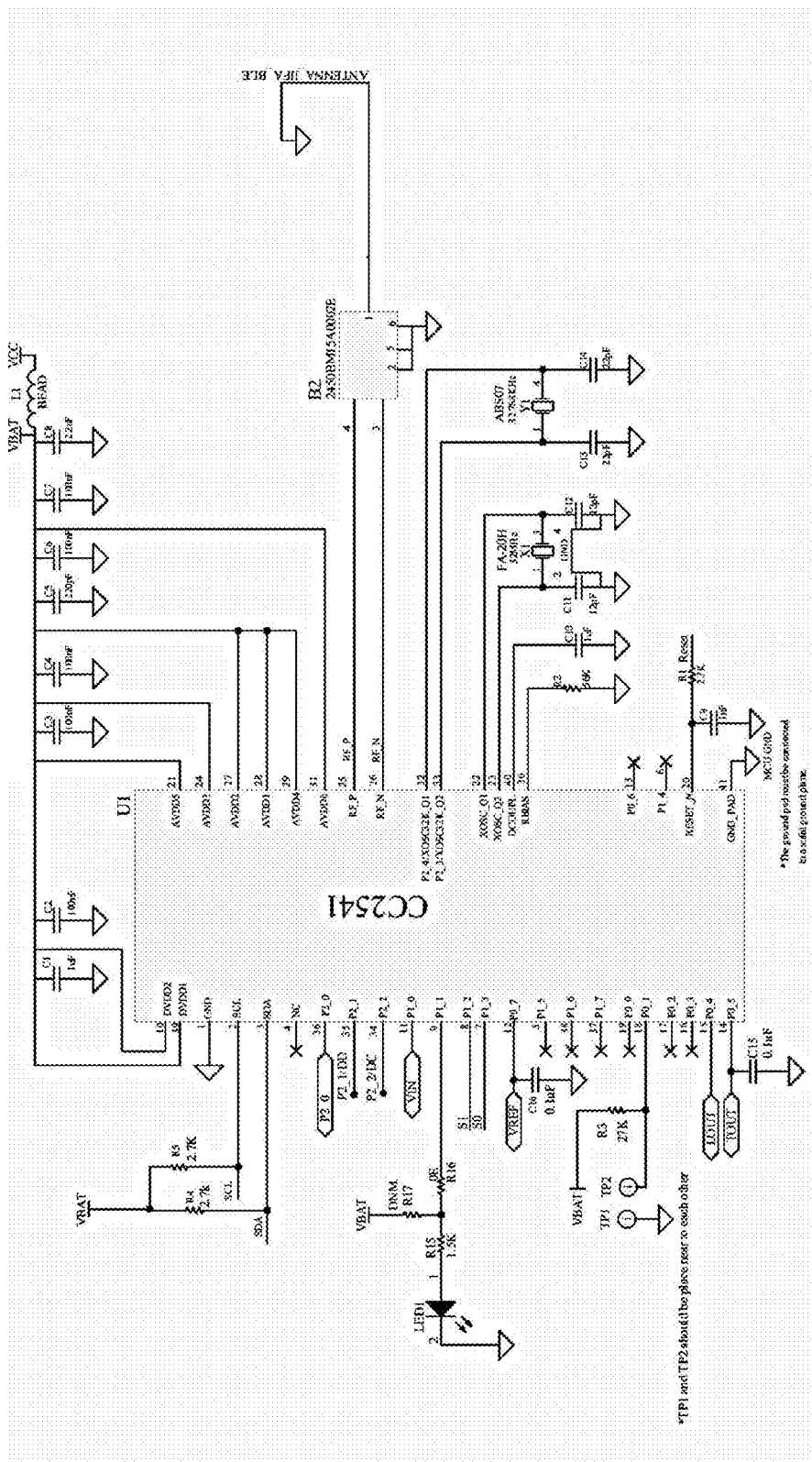
FIG. 7F is an exemplary schematic diagram of the electrical circuit for the micro-controller.
Figure 7G:
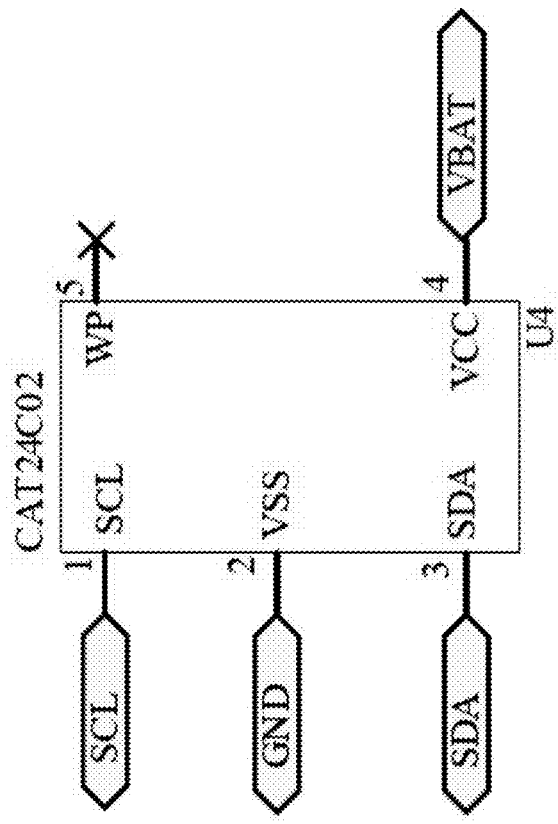
FIG. 7G is an exemplary schematic diagram of the electrical circuit for the Electrically Erasable Programmable Read-Only Memory (EEPROM)) card or chip.
Figure 7G:
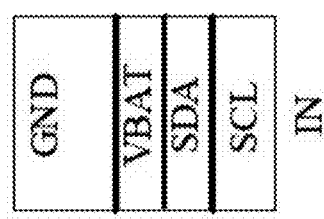
Figure 7H:
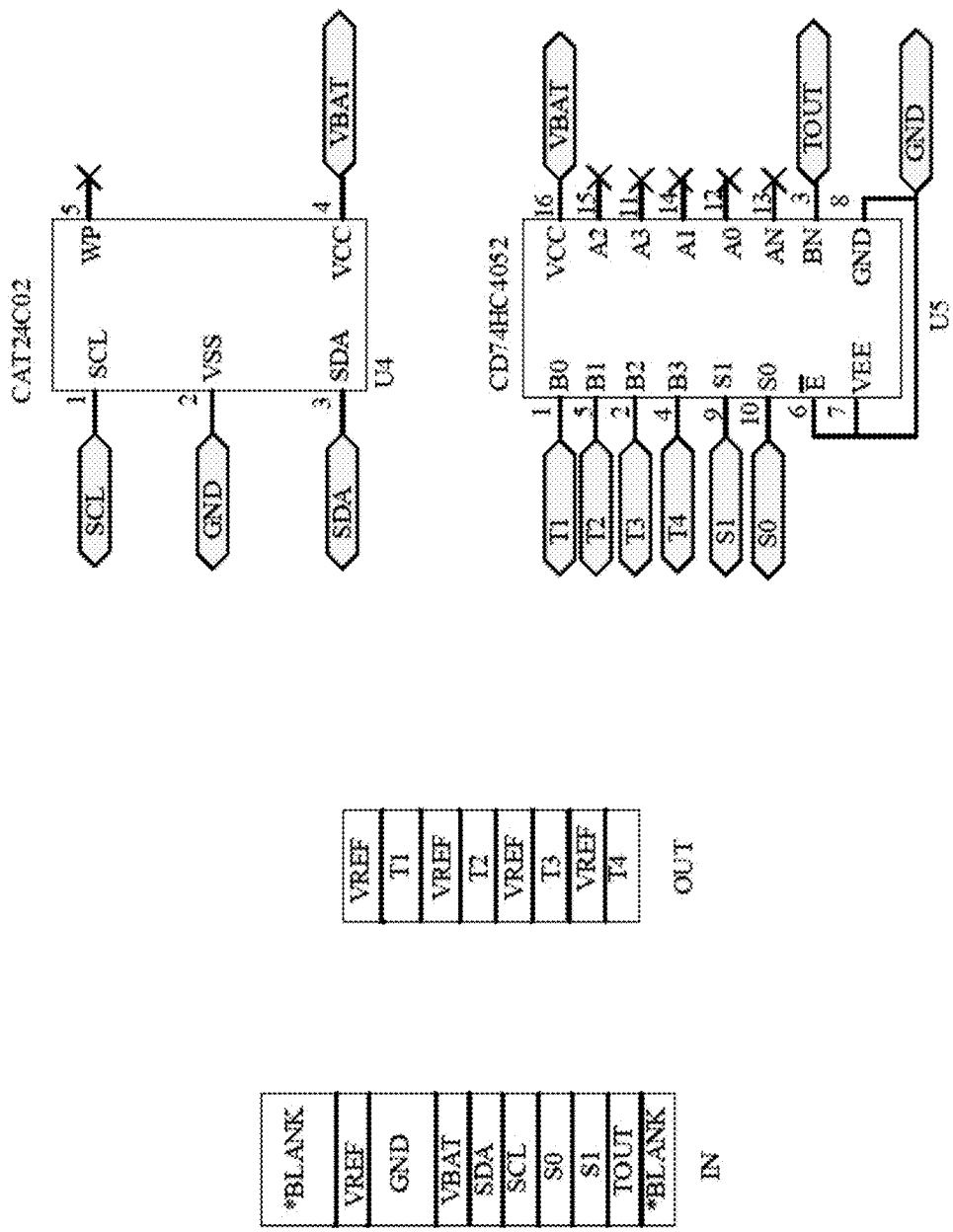
FIG. 7H is an exemplary schematic diagram of the electrical circuit for the EEPROM card or chip with connections to multi-thermistor sensors.

Connector unit 20 further comprises a twelve pins connector embedded in the inner surface of the bottom case 22, at the opposing closed end. Connector unit 20's twelve pins connector comprises the same pins as the ID PCB 30's twelve pins connector, and the two are in direct contact to transmit electrical signals from the pluggable unit 10's micro-controller in the mid-case 40 to the compatible apparatus's EEPROM card and sensors (as shown in FIGS. 7G and 7H).

The ID PCB unit 30, which comprises a flat rectangular member or section with the twelve pins connector, that is able to identify the specific type of compatible apparatus (e.g. a spatula, bowl, lawn sprinkler, etc.), and the identification code assigned to the apparatus. And the ID PCB unit 30 is also able to integrate with a multiplexer to enable the Wi-Key device to electrically connect with multiple sensors simultaneously. The sensors may be within wireless range of the compatible apparatus and/or embedded within the compatible apparatus.

Table 1 provides a listing of the exemplified twelve pins connector, comprising: pin 1-a connection to a thermistor sensor within the apparatus; pin 2 and 3—connection to a load cell sensor within the apparatus; pin 4 is used for a fixed voltage reference; pin 5 is ground 1; pin 6 is ground 2 that is shunted when the pluggable unit 10 is plugged into the connector unit 20; pin 7 Vbat is the battery voltage connection for 2.5 volts; pin 8 and 9 are the connection to EEPROM or $I_2C$ or transducer sensors; pin 10 and 11 are connections to a multiplexer; and pin 12 is a connection to a micro-controller for power or control of the $I_2C$ or transducer sensors.

TABLE 1

| Pin # | Pin Name |
| --- | --- |
| 1 | TOUT: Thermistor signal |
| 2 | SIG −: Load cell "−" signal |
| 3 | Sig +: Load cell "+" signal |
| 4 | Vref: Fixed voltage reference |
| 5 | GND 1: Ground |
| 6 | GND 2: Shunted when Wi-Key is plugged in |
| 7 | Vbat: Battery voltage (2.5 V) |
| 8 | SDA: Serial data line |
| 9 | SCL: Serial clock |
| 10 | S0: Multiplexer line 1 |
| 11 | S1: Multiplexer line 2 |
| 12 | MCU: For power or control of $I_2C$ sensors (connected to MCU) |

Method of Use

Upon plugging the Wi-Key device 100 into a slot 110 on a compatible apparatus, the mid-case 40 micro-controller reads the identification number of the apparatus. This information is relayed to the micro-controller from the EEPROM card within the apparatus via the twelve pins connector of the ID PCB unit 30 to the connector 20. In addition to the apparatus's unique identification number, sensor data or information (type of sensors, etc.) may be relayed. This information is then wirelessly transmitted to the user electronic computing device. The application installed on the user device will then check if the identification number is confirmed by the manufacturer. For example, the application may access via a wired or wireless network a database on a remote server that stores all valid identification numbers for all or specific type(s) of compatible apparatuses. If the identification number is valid, then the application will analyze the transmitted sensor data. But if the identification number is not valid, then a message made be displayed on the user device stating that the apparatus is not enabled for use with a Wi-Key device.

System Architecture

The system of the various embodiments as disclosed are substantially similar to that disclosed in U.S. Pat. No. 9,060,212 B2 that issued on Jun. 16, 2015 to Mucha, the entirety of which is herein incorporated by reference, with the exception that the iKT™ device is replaced with the Wi-Key device 100, and a remote or local server is added with a database that stores the identification numbers for the compatible apparatuses. Therefore, in addition to Wi-Key device 100 and remote server and a wireless network, the system further comprises: one or more compatible apparatuses that each house one or more sensors (e.g. $I_2C$ sensors, transducer sensors); one or more user electronic computing devices for receiving processed sensor data via wireless transmissions from a Wi-Key device 100, after which it is analyzed and displayed on the user device if the identification number of the apparatus is determined to be valid.

The user electronic computing device comprises a secondary memory device, such as, for example, a hard disk drive or other non-transitory, non-volatile memory, for storing sensor data and user information, such as lists of recipes and apparatus operating instructions. The user device also comprises a graphical interface user for displaying apparatus information, such as temperatures, weights and instructions; and one or more input mechanisms (e.g. touchscreen, keyboard, etc.).

The user device may further have installed within the computer memory, software or modules (i.e. of a mobile application) for use in receiving, transmitting, and viewing commands, identification information, and data between the user device and the Wi-Key device, and for analyzing the sensor data. The application or software or user device comprises a non-transitory computer readable medium containing computer executable instructions to carry out the methods of receiving and storing sensor data, and methods of transmitting apparatus operating commands (e.g. turn on/off); and methods of displaying user information, such as recipes, in accordance with the present disclosure. The computer executable instructions are adapted for execution by a hardware element, such as a processor, wherein the instructions comprise commands that when executed cause the processor to perform a corresponding set of commands, such as receive and analyze sensor data, and transmit apparatus operating commands. The software may be written or coded using a programming language, and stored using any type of non-transitory computer-readable media or machine-readable media well known in the art. Examples of software in the present invention comprise any software components, modules, programs, applications, computer programs, application programs, system programs, machine programs, and operating system software.

The user device may also comprise software to emit audio messages, such as sensor data—temperature, weight, etc.; and to receive and transmit audio messages spoken by the user into their device—such as "turn off the oven". The software would be used, for example, by users with a visually impairment. Software for assisting visually impaired individuals in using their mobile devices are readily known in the art, such as Ski® and Voiceover®, and could be used in conjunction with the present disclosure. Or, visual impairment functionality could be incorporated into the software comprising apparatus control and sensor monitoring.

It will be appreciated by one with skill in the art that the application might be installed on the user device from a number of sources such as, for example, downloaded over the Internet from a server, or bundled with software provided by another software manufacturer (such as a Web browser provided by a Web browser manufacturer). It will be appreciated that the application will function in substantially the same manner regardless of the installation source or method.

Wireless Transmission

Wireless transmission methods include known cable-free methods, for example via infrared, wireless personal area network (WPAN) carried over wireless network technologies such as IrDA, Bluetooth®, Wireless USB, Z-Wave, ZigBee, or even Body Area Network.; or other radio links that comprise Wi-Fi—a wireless local area network (WLAN) based on the Institute of Electrical and Electronics Engineers' (IEEE) 802.11 standards. In a particularly preferred embodiment, the wireless transmission between the Wi-Key device and the user device (i.e. smartphone) is accomplished via the use of Bluetooth® technology (V2.1-V4.2 or later) or Wi-Fi. Bluetooth® electronic communications devices of the present disclosure comprise computing devices, such as laptops, desktops, tablets, mobile phones, etc., with a Bluetooth® wireless card either built in or added on via USB connector/adapter. Bluetooth® technology allows these computing devices to connect instantly to the Bluetooth® chip within the Wi-Key device in order to transmit data between the two devices. Additionally, the version of Bluetooth® chip used may alter the power required to be supplied by the battery wherein later versions of Bluetooth®, such as V4.2 and later, require significantly less power.

Sensors

A variety of types of compatible apparatuses comprise one or more sensors that can electronically transmit raw sensor data to the Wi-Key device 100 when it is inserted into the apparatuses. Different apparatuses may house the Wi-Key device in different locations within the apparatuses. For example, in apparatuses compatible for cooking environments, the Wi-Key device is inserted into the side of a cutting board; the side of the base of a mixing bowl and measuring jag/cup; the middle of the handle of a utensil (i.e. turner, spatula); one end of a rolling pin; and the end of the handle of a pizza cutter.

The sensors comprise: sensors to monitor conditions within and/or around a compatible apparatus into which it is housed; and electrical circuitry to collect and transmit raw sensor data to the Wi-Key monitoring device via the twelve pins connector. The raw sensor data may be stored in non-volatile memory storage of the EEPROM card (i.e. Electrically Erasable Programmable Read-Only Memory-EEPROM card) that is affixed within the compatible apparatus.

The sensor may also comprise a "controller" comprising electronic circuit components to enable a user to control the apparatus by sending commands from the user device to the Wi-Key device 100. The controller structure depends on the type of apparatus, and it may be different from one apparatus to the next.

Sensors for use in the apparatuses are widely known in the art, and comprise two primary types: those compatible with an inter-integrated I$_2$C circuit bus, and transducer sensors that convert a variety of types of signals (e.g. mechanical from a load cell weighing food) to electrical signals. Examples of parameters that sensors use in compatible apparatuses, comprise by way of non-limiting examples: weight; temperature; air pressure; movement; pressure; gas; contact; sound; etc. The intended use of the apparatus also determines the type of sensor used for transmission of processed and raw data to the Wi-Key device 100, such as temperature (T°) for a turner/spatula/ladle/oven mat or weight (lb.) for a mixing bowl/measuring jag/cup.

Exemplary apparatuses compatible with the Wi-Key device 100 that house sensors or not, comprise by way of non-limiting examples: lawn sprinklers; toys; mixing bowls; cutting boards; cocktail shaker; sauce shakers; measuring jugs, spoons, and cups; rolling pins; silicone over mats; cake molds; popup timers; pizza cutters; cheese graters; ice cream scoops; peelers; whisks; spatulas; turners; basting spoons; slotted spoons; ladles; brushes; mini-slotted turner; food container; ice cube tray; coffee makers; ovens; refrigerators; and preparation robots.

The Wi-Key device may be used in a variety of venues for a variety of purposes. Therefore, the type of sensors appropriate for use in a particular compatible apparatus is determined by the apparatus's function and power source requirements. For example, if the sensor measures weight (i.e. cooking ingredients), then the sensor may comprise a load cell with a 4 pin connection, while a sensor for measuring temperature may comprise a thermistor with a 2 pin connection.

Exemplification of Thermo-Spatula

Figure 5B:
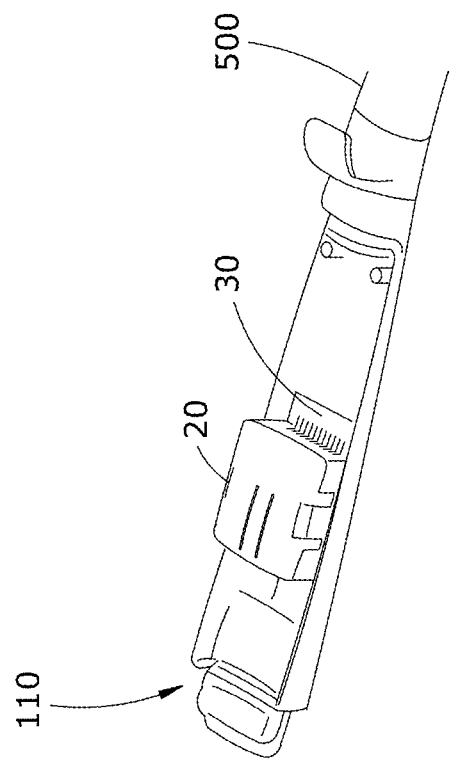
FIG. 5B is an illustration of FIG. 5A disassembled exposing the Wi-Key device as it is inserted within the handle of the spatula.
Figure 5A:
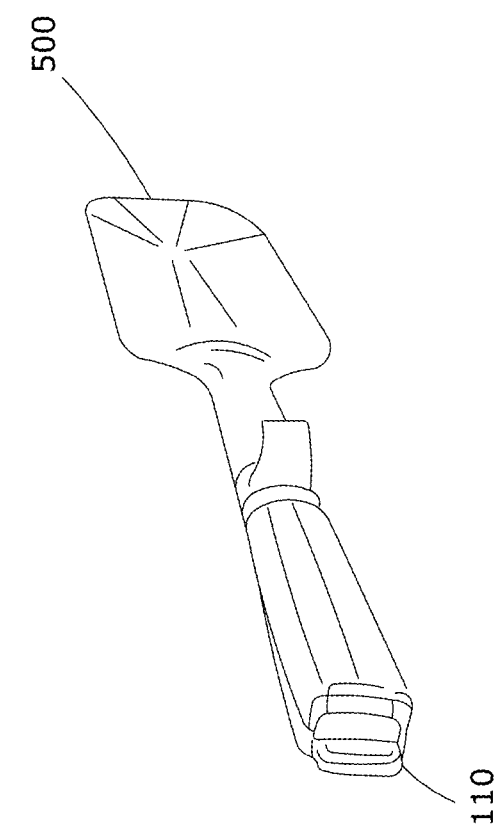
FIG. 5A is an illustration of an exemplification of the Wi-Key device inserted into the end of a spatula handle to monitor a thermistor sensor residing in the spatula blade.

FIGS. 5A and 5B illustrate an exemplification of the Wi-Key monitoring device designed for use in a compatible apparatus comprising a thermos-spatula 500. The assembled thermos-spatula 500 illustrated in FIG. 5A comprises a thermistor sensor within the blade that comes into contact with food, such as hot food being stirred in a skillet or baked goods being lifted from an oven baking sheet. The opposing end of thermos-spatula 500 comprises a rectangular shaped slot 110 for inserting the Wi-Key pluggable unit 10 (not shown).

Thermo-spatula 500 is shown in FIG. 5B lacking the bottom side of the handle cover in order to expose the connector unit 20 and the ID PCB unit 30 that are both permanently fixed into the handle. When a user plugs the Wi-Key pluggable unit 10 (not shown) into slot 110 and contacts the connector unit 20, then the Wi-Key monitoring device 100 may be activated to enable a user electronic computing device to verify the identification number of the spatula. Only if the identity of the apparatus is verified, will the user device then display the temperature of the spatula blade, and hence the food it has contacted. This occurs when the thermistor sensor raw data is transmitted wirelessly from Wi-Key device 100 to a user electronic computing device for a software module that is loaded on the user's device to convert the raw data into a temperature. The software may also provide additional analysis, such as conversion of the temperature to a user designated degree type, e.g. converting degrees in Fahrenheit to Celsius. The temperature is then displayed on the graphical user interface, or display, of the user's device.

Exemplification of Mixing Bowl

Figure 6B:
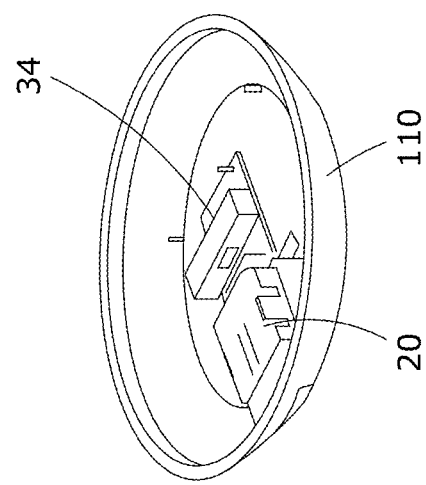
FIG. 6B is an illustration of FIG. 6A disassembled exposing the Wi-Key device as it is inserted into the base of the mixing bowl.
Figure 6A:
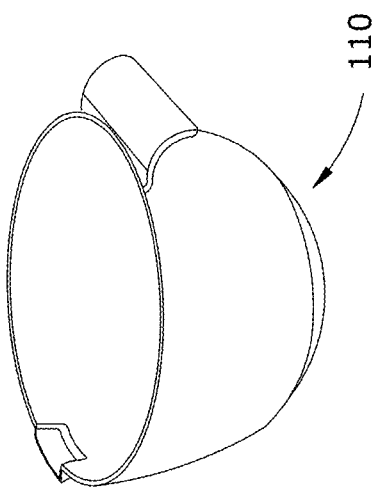
FIG. 6A is an illustration of an exemplification of the Wi-Key device inserted into the bottom of a mixing bowl to monitor a load cell for measuring the weight of ingredients within the bowl.

Likewise, FIGS. 6A and 6B illustrate another exemplification comprising a compatible mixing bowl apparatus with a sensor unit comprising a load cell 34 embedded in the bottom base of the bowl. Load cell 34 is able to detect the weight of food and ingredients within the bowl, and send the raw sensor data to a user electronic computing device via the Wi-Key device 100. The Wi-Key pluggable unit 10 (not shown) is inserted into slot 110 at the base of the bowl until it plugs into connector unit 20 as shown in FIG. 6B, which is a disassembled view of the bowl's bottom base without the top bowl. Between connector unit 20 and load cell 34 resides the twelve pin connectors of the ID PCB unit 30 (not shown) which receives the information comprising the apparatus's identification number and the raw sensor data from load cell 34 and via the wired circuit transmits it to the micro-controller in the mid-case 40 (see FIG. 3). The micro-controller then wirelessly transmits the information the user electronic computing device. Once the identification number has been checked on a remote server to be valid, then the sensor data is analyzed and displayed on the user device.

The user electronic computing device may also be used to wirelessly transmit commands to the operational controls of a compatible apparatus. The commands are wirelessly transmitted to the pluggable unit 10 micro-controller housed within mid-case 40. The commands are then transmitted via the electric circuits and the twelve pin connectors to the connector unit 20 and the ID PCB 30, which subsequently relays the commands to the apparatus's operational controls (e.g. power switch).

While all of the fundamental characteristics and features of the various embodiments of the present disclosure have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention or claims herein. Consequently, all such modifications and variations and substitutions are included within the scope of the invention as defined by the following claims.

What is claimed is:

1. A device insert-able into a compatible apparatus, the compatible apparatus comprising a unique identification number and one or more sensors able to monitor conditions within and around the compatible apparatus, the Wi-Key device comprising outer units of:
    a. a substantially thin rectangular shaped pluggable unit with two opposing long ends, and able to attach and detach from a connector unit on a long end;
    b. a substantially square shaped connector unit;
    c. a substantially flat rectangular shaped identification and printed circuit board unit affixed across a bottom end of the connector unit on the opposite end to the pluggable unit; and
    d. wherein the connector unit and the identification and printed circuit board unit are permanently affixed within the compatible apparatus, and the pluggable unit is insert-able into and remove-able from a slot on the compatible apparatus.

2. The device of claim 1 further comprising one or more electric circuits able to transmit data between: 1) one or more sensors and an EEPROM card housed within the compatible apparatus, and 2) a user electronic computing device, wherein the sensors are configured to monitor conditions within and around the compatible apparatus.

3. The device of claim 2, wherein the thin rectangular shaped pluggable unit further comprises a micro-controller housed in a back case comprising:
 a. two long sides and two short sides, wherein one short end is curved and the opposing short end is straight;
 b. an inner side of the curved short end perpendicularly affixed to a thin, flat rectangular member;
 c. a flat magnet centered within the flat rectangular member able to affix the to a metal object; and
 d. wherein the back case is slide-able into a device mid-case.

4. The device of claim 3, the pluggable unit further comprising:
 a. a substantially hollow, rectangular shaped mid-case with two long sides and two short sides, wherein the back case slides into and out of one short side, and the opposing short side plugs into a connector unit; and
 b. a cutout on a top side of the back case sized to fit a slide-able front case.

5. The device of claim 4, the back case of the pluggable unit further comprising:
 a. a flat rectangular member of substantially the same size as the back case, slide-able into the back case via the cut-out;
 b. a battery affixed to a top side of the rectangular member to align with the cutout; and
 c. a printed circuit board embedded into the bottom side of the rectangular member and comprising the micro-controller.

6. The device of claim 5, wherein the printed circuit board of the pluggable unit comprises:
 a. a twelve pin connector able to electrically communicate with a twelve pin connector of the connector unit, and a twelve pin connector of the identification and printed circuit board unit;
 b. a microcontroller able to process a plurality of raw sensor and memory data, and to convert the raw data from analog-to-digital without analyzing the data; and
 c. a wireless unit to wirelessly transmit the processed data from the microcontroller to a user electronic computing device, and control commands from the user electronic computing device to the sensors.

7. The device of claim 4, the pluggable unit further comprising a substantially flat, square-shaped front case that is slide-able into the mid-case cut-out and positioned to allow access to the mid-case battery.

8. The device of claim 1, the square shaped connector unit further comprising:
 a. a substantially flat square top case, with a plurality of downward side extending members able to connect with matching cutouts in a bottom case;
 b. a three sided bottom case with the matching cutouts on two or more sides and with an open side able to insert the pluggable unit;
 c. a twelve pins connector embedded in the inner surface of the bottom case; and
 d. an internal spring mechanism able to assist plugging the pluggable unit into the connector unit.

9. The device of claim 6, further comprising:
 a. the micro-controller is able to transmit the type of compatible apparatus, and/or the apparatus identification number to the user electronic computing device;
 b. wherein the user electronic computing device is unable to analyze or display the sensor data if the identification number is invalid.

10. The device of claim 9, wherein the identification and printed circuit board unit further comprise a multiplexer to enable the device to electrically connect with multiple sensors simultaneously within the compatible apparatus.

11. A device insert-able into a compatible apparatus, the compatible apparatus comprising one or more sensors able to monitor conditions within and around the compatible apparatus, the device comprising:
 a. a pluggable unit able to attach and detach from a connector unit, wherein the pluggable unit houses a micro-controller able to wirelessly transmit a type of compatible apparatus, and/or an apparatus identification number, and raw sensor data from one or more sensors housed within or near the compatible apparatus to a user electronic computing device;
 b. a connector unit affixed within the compatible apparatus;
 c. an identification and printed circuit board unit affixed to the connector unit within the compatible apparatus and on the opposite end to the pluggable unit; and
 d. wherein the connector unit and the identification and printed circuit board unit are permanently affixed within the compatible apparatus, and the pluggable unit is insert-able into and remove-able from a slot on the compatible apparatus.

12. The device of claim 11, wherein the pluggable unit further comprises:
 a. a twelve pins connector able to electrically communicate with the connector unit and the identification and printed circuit board unit;
 b. a battery able to power the micro-controller and the apparatus sensors; and
 c. a debugger able to program the micro-controller.

13. The device of claim 11, the identification and printed circuit board unit further comprising:
 c. a twelve pins connector able to transmit the identify the type of, and/or the identification number of, the compatible apparatus from an EEPROM card housed within the compatible apparatus; and
 d. wherein the device micro-controller wirelessly transmits the type and/or the identification number to the user electronic computing device.

14. The device of claim 13, wherein the identification and printed circuit board unit further comprises a multiplexer to enable the device to electrically communicate simultaneously with multiple sensors housed within or near the compatible apparatus.

15. The device of claim 13, wherein the connector unit further comprises:
 a. a twelve pins connector embedded in the unit and in electrical contact with the twelve pins connector of the pluggable unit and twelve pins connector of the identification and printed circuit board unit; and
 b. an internal spring mechanism able to assist plugging the pluggable unit into the connector unit.

16. A method of use of an electronic monitoring device to monitor conditions within and around a compatible apparatus, the compatible apparatus comprising one or more sensors, comprising:
 a. providing a Wi-Key device comprising three units:
  i. a pluggable unit able to attach and detach from a connector unit, wherein the pluggable unit houses a magnet, a battery, a printed circuit board with a micro-controller and a wireless unit;

ii. a connector unit affixed within the compatible apparatus, and comprising a twelve pins connector;

iii, an identification and printed circuit board unit comprising a twelve pins connector and affixed to the connector unit within the compatible apparatus and on the opposite end to the pluggable unit;

b. inserting the pluggable unit into the compatible apparatus to contact the connector unit, i. wherein the identification and printed circuit board unit transmits a type of compatible apparatus and/or an apparatus identification number to the pluggable unit, and ii. wherein the compatible apparatus comprises one or more sensors collecting data comprising conditions within and around the apparatus, and an EEPROM card that stores the sensor data and the apparatus identification number;

c. collecting and processing by the pluggable unit microcontroller, the raw data from one or more sensors and the EEPROM card; and d. wirelessly transmitting the processed raw data from the microcontroller to a user electronic, computing device, wherein the data is analyzed, stored and viewed after the type of compatible apparatus and/or the identification number is verified.

17. The method of claim 16, further comprising the pluggable unit wirelessly receiving one or more control commands for the compatible apparatus from the user electronic computing device and transmitting the commands to the compatible apparatus via the identification and printed circuit board unit.

18. The method of claim 16, wherein the printed circuit board of the pluggable unit further comprises:
   a. a voltage amplifier;
   b. a voltage regulator;
   c. a twelve pins connector; and
   d. a debugger able to program the micro-controller.

19. The method of claim 17, wherein the identification and printed circuit board unit further comprises a multiplexer to enable the device to electrically connect simultaneously with multiple sensors within the compatible apparatus.

20. The device of claim 18, wherein the connector unit further comprises:
   a. a twelve pins connector in electrical contact with the pluggable unit twelve pins connector, and with the identification and printed circuit board unit twelve pins connector; and
   b. an internal spring mechanism able to assist plugging the pluggable unit into the connector unit.

* * * * *